US008876464B1

(12) United States Patent
Jones et al.

(10) Patent No.: US 8,876,464 B1
(45) Date of Patent: Nov. 4, 2014

(54) SEQUENTIAL COOLING INSERT FOR TURBINE STATOR VANE

(71) Applicants: Russel B Jones, North Palm Beach, FL (US); Judson J Krueger, Jupiter, FL (US); William L Plank, Tequesta, FL (US)

(72) Inventors: Russel B Jones, North Palm Beach, FL (US); Judson J Krueger, Jupiter, FL (US); William L Plank, Tequesta, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 14/176,730

(22) Filed: Feb. 10, 2014

Related U.S. Application Data

(62) Division of application No. 13/685,053, filed on Nov. 26, 2012, now Pat. No. 8,684,668.

(60) Provisional application No. 61/725,507, filed on Nov. 13, 2012.

(51) Int. Cl.
*F01D 9/04* (2006.01)
*F01D 5/18* (2006.01)

(52) U.S. Cl.
CPC ..................................... *F01D 5/188* (2013.01)
USPC ..................... 415/115; 416/97 R; 416/96 A

(58) Field of Classification Search
USPC .................. 415/115, 116, 96 R, 97 R, 212 A
See application file for complete search history.

(56) References Cited

U.S. PATENT DOCUMENTS

| | | | | |
|---|---|---|---|---|
| 2,879,944 A | * | 3/1959 | Musgrave | 239/20 |
| 5,297,937 A | * | 3/1994 | Umetani et al. | 416/233 |
| 5,363,654 A | * | 11/1994 | Lee | 60/752 |
| RE40,658 E | * | 3/2009 | Powis et al. | 415/1 |
| 8,500,405 B1 | * | 8/2013 | Jones et al. | 416/97 R |
| 2002/0114696 A1 | * | 8/2002 | Miller et al. | 415/115 |

* cited by examiner

*Primary Examiner* — Dwayne J White
(74) *Attorney, Agent, or Firm* — John Ryznic

(57) ABSTRACT

A sequential impingement cooling insert for a turbine stator vane that forms a double impingement for the pressure and suction sides of the vane or a triple impingement. The insert is formed from a sheet metal formed in a zigzag shape that forms a series of alternating impingement cooling channels with return air channels, where pressure side and suction side impingement cooling plates are secured over the zigzag shaped main piece. Another embodiment includes the insert formed from one or two blocks of material in which the impingement channels and return air channels are machined into each block.

12 Claims, 23 Drawing Sheets

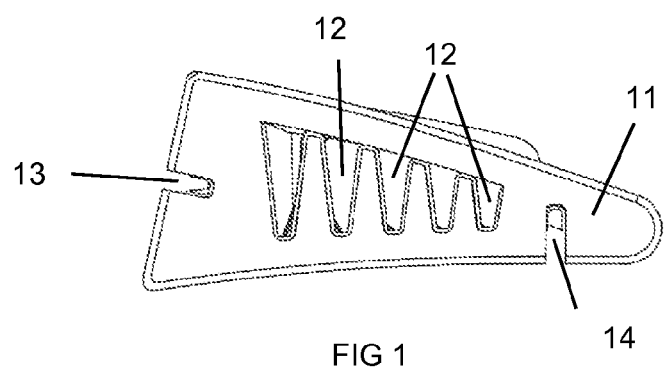
FIG 1
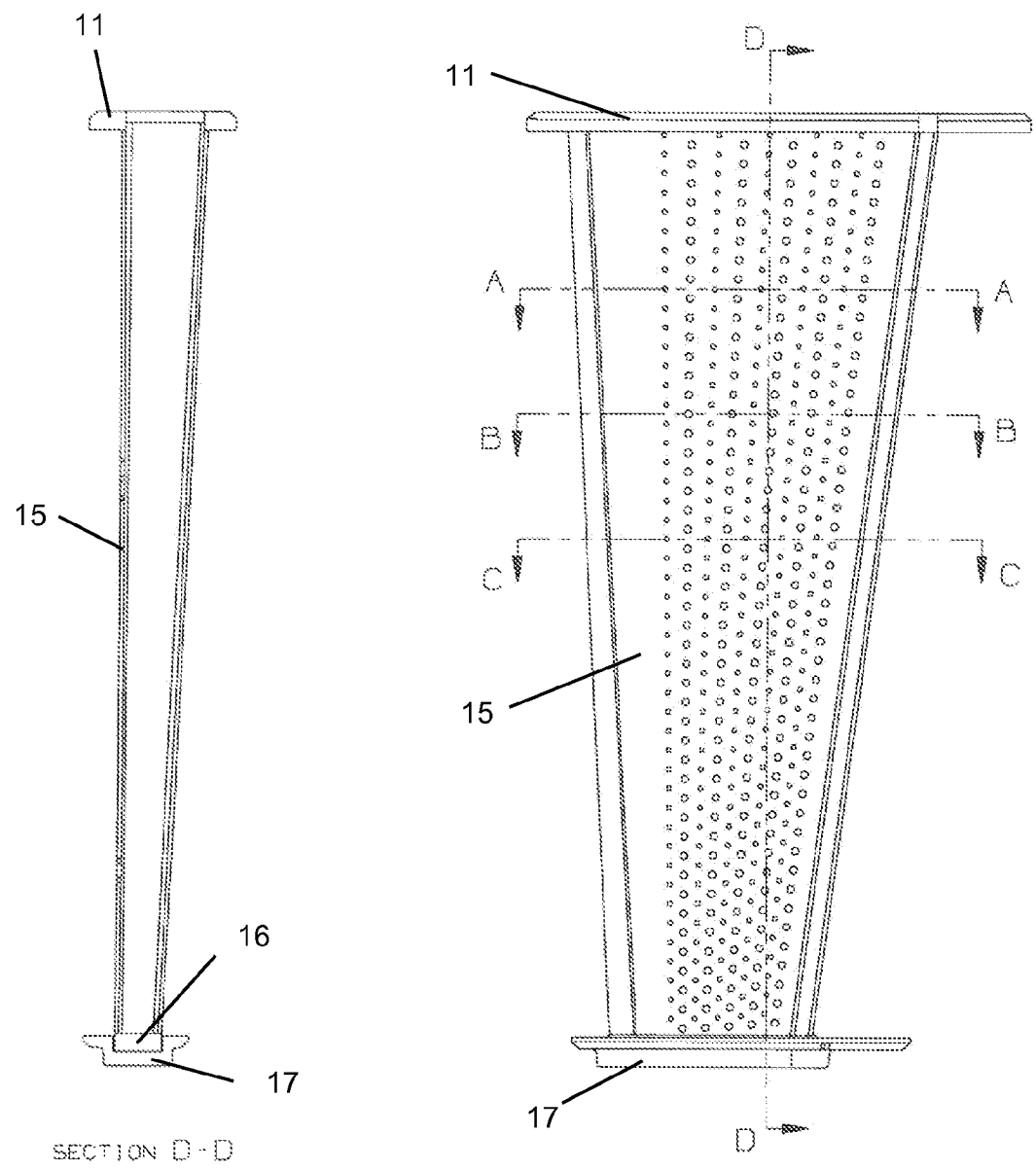
FIG 2
FIG 3

SECTION D-D

SECTION D-D

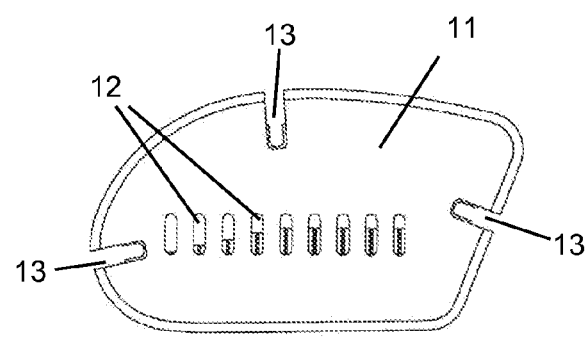
FIG 22
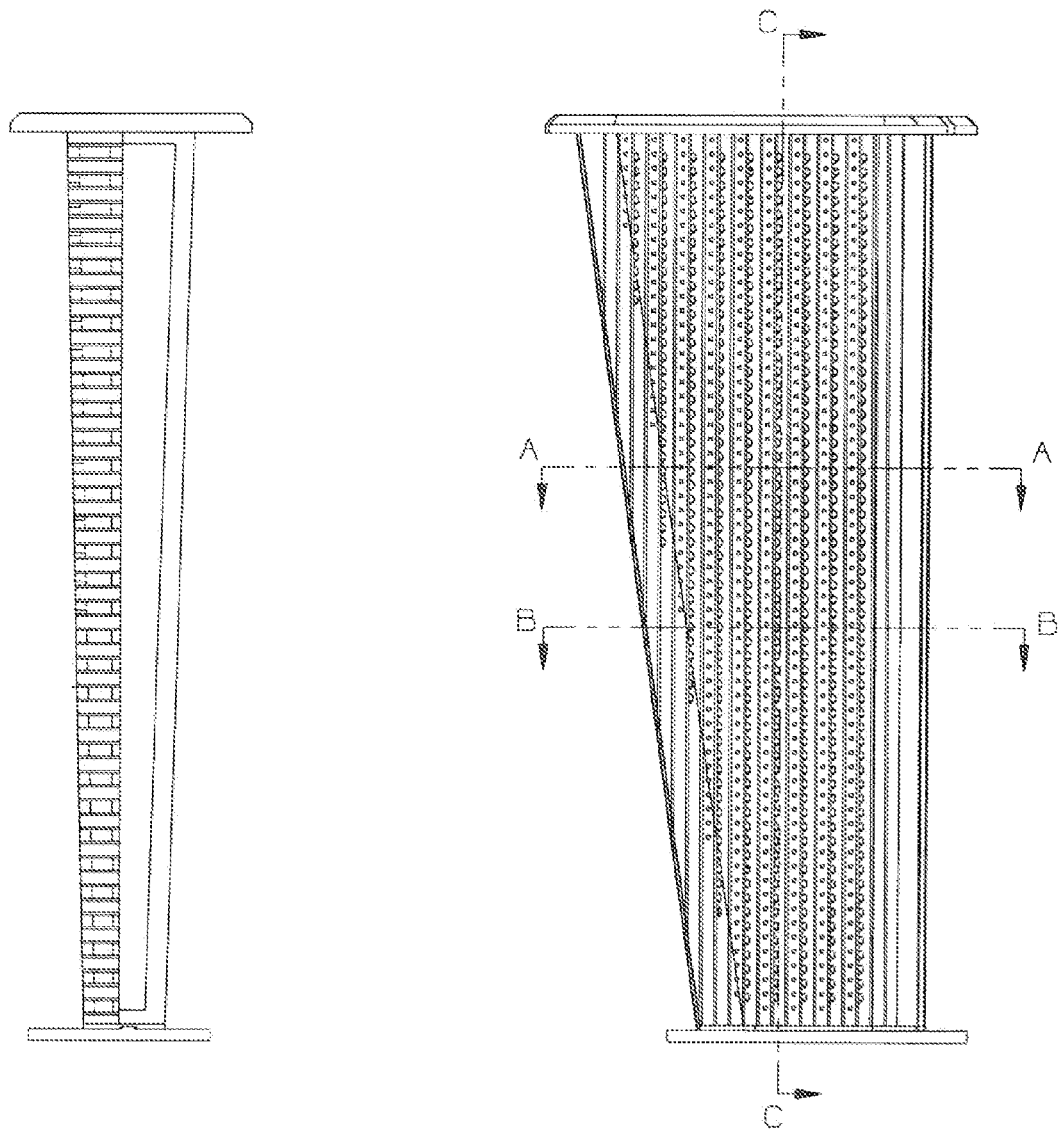
SECTION C-C
FIG 23
FIG 24

SECTION A-A

SECTION B-B

SECTION D-D

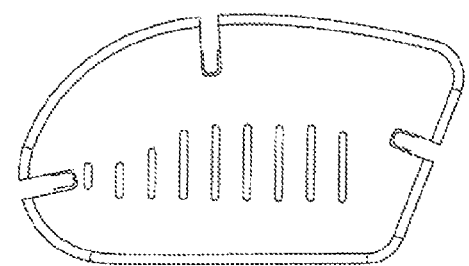
FIG 35
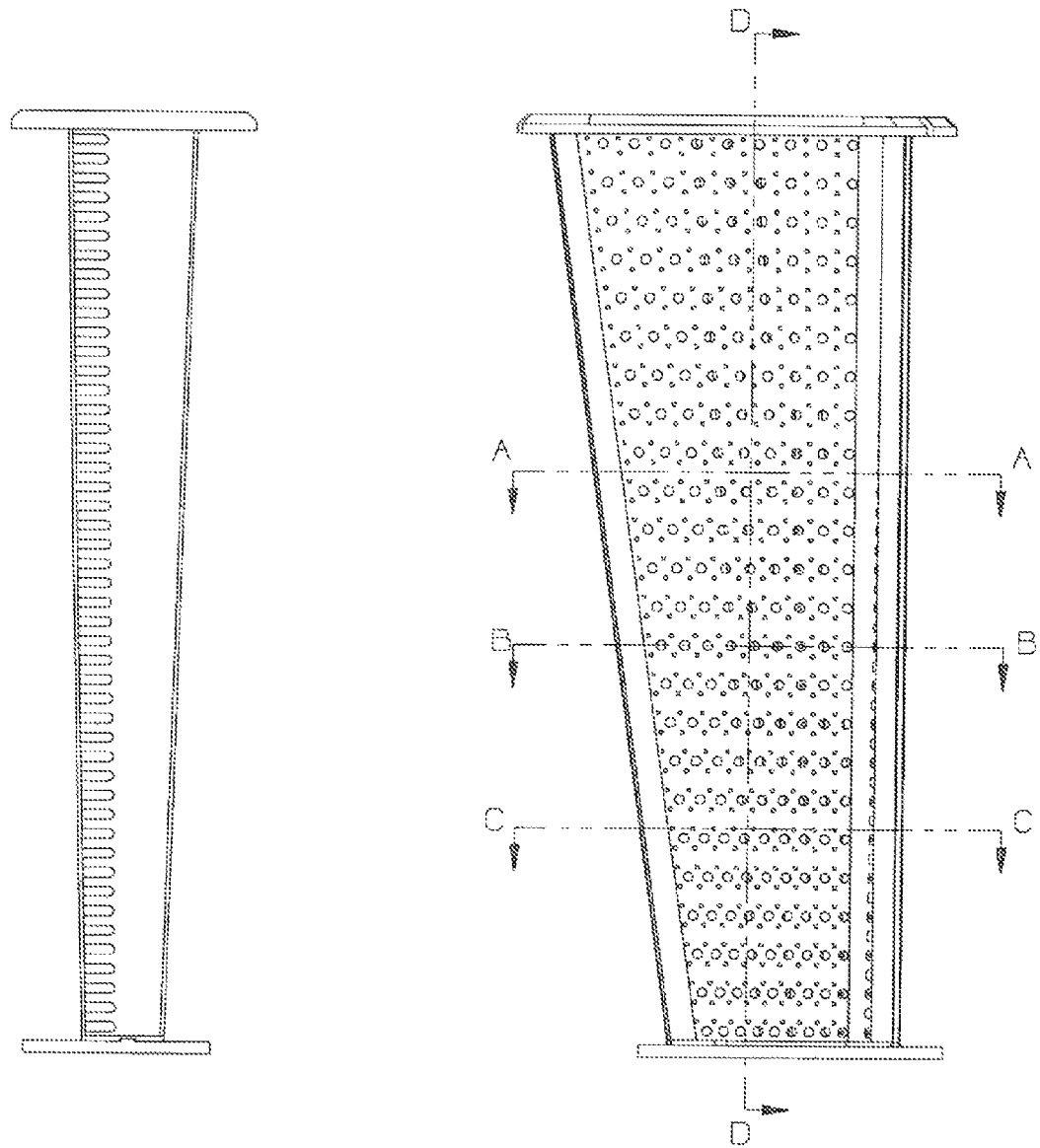
SECTION D-D
FIG 36
FIG 37

SECTION A-A

SECTION B-B

SECTION C-C

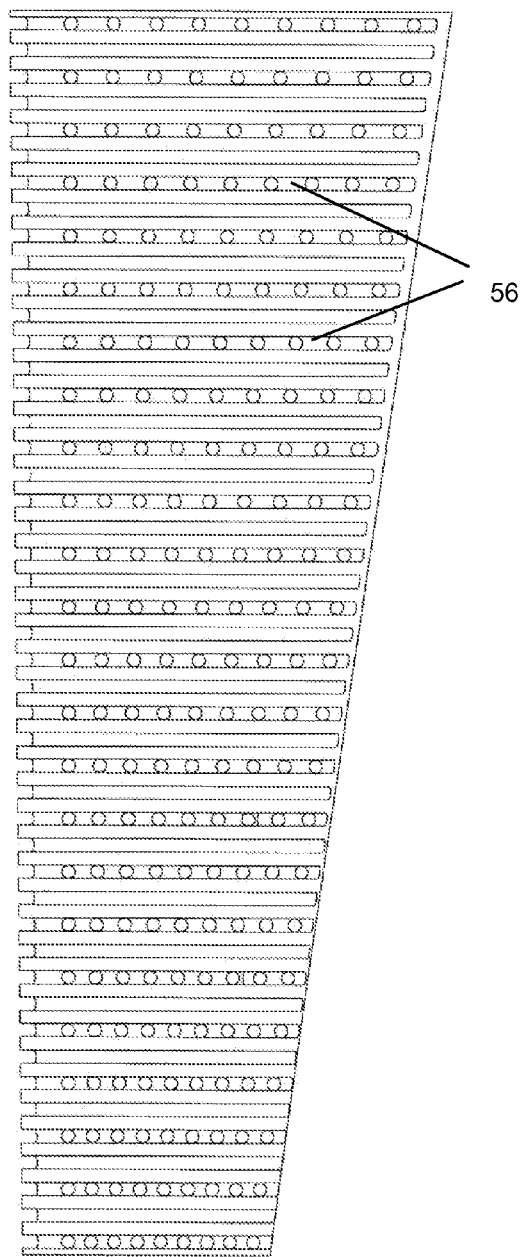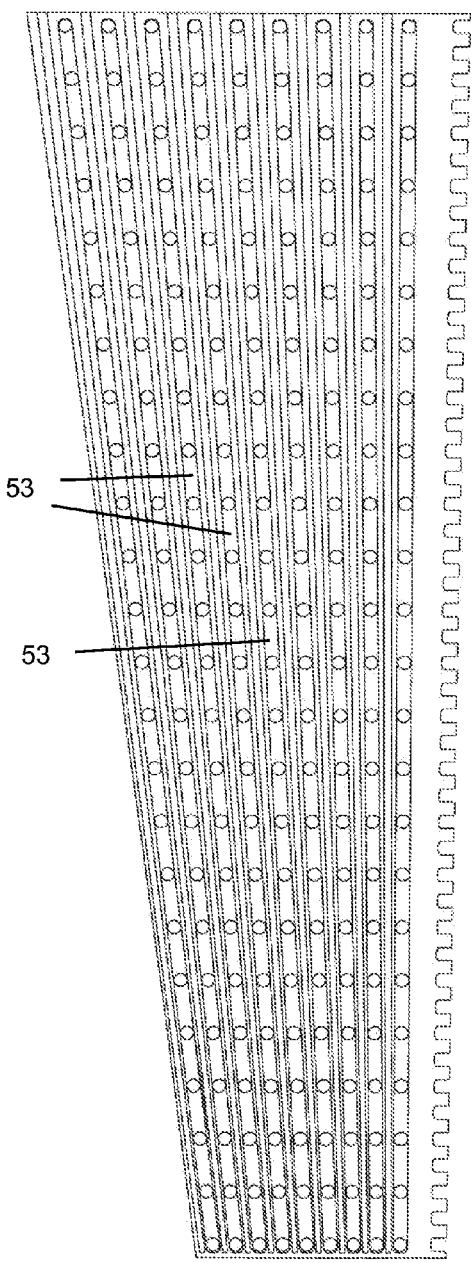
FIG 42 · FIG 43

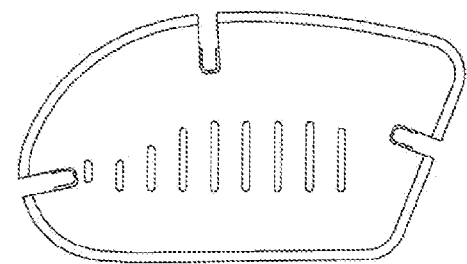
FIG 44
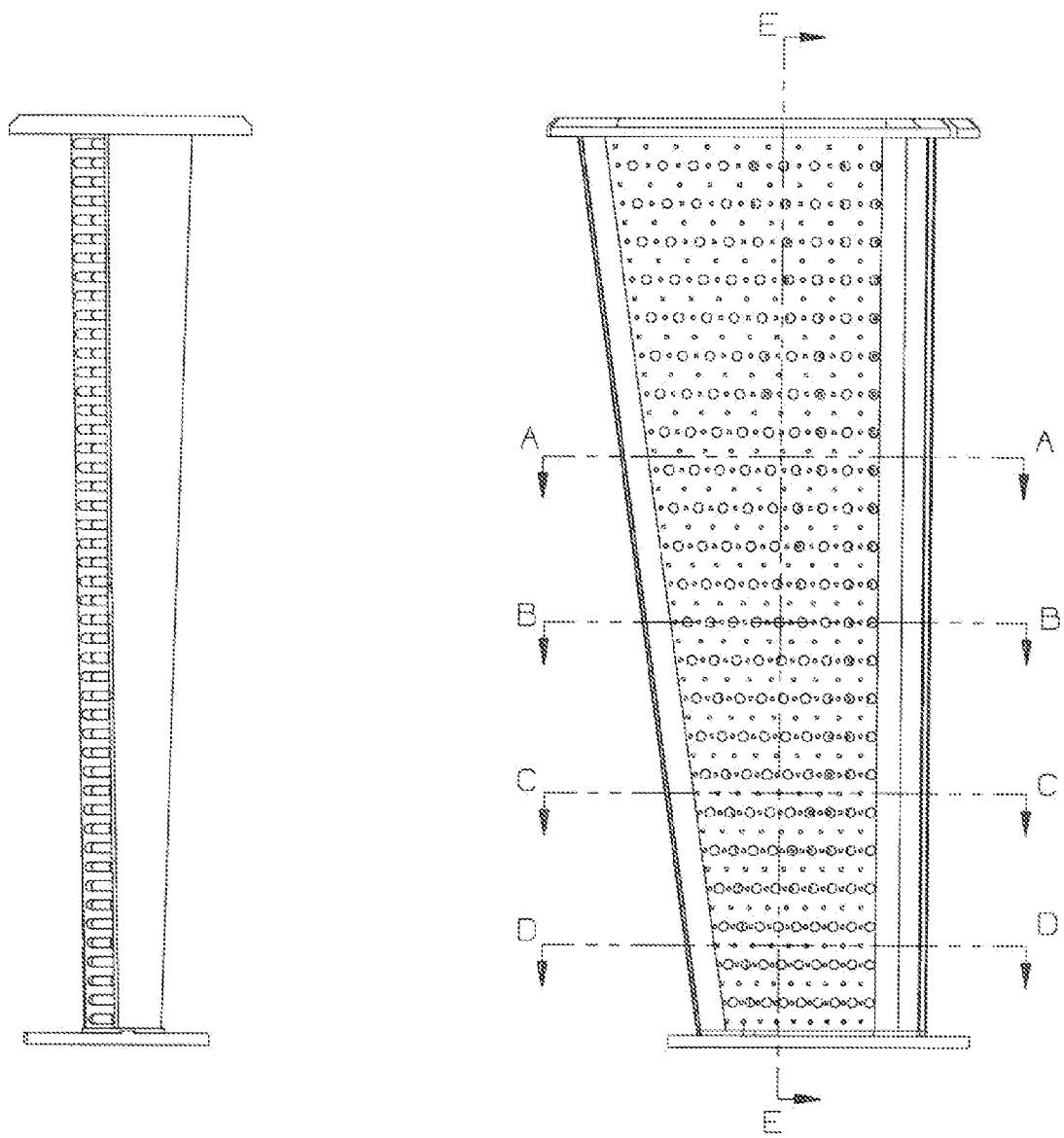
SECTION E-E
FIG 45
FIG 46

SECTION A-A

SECTION B-B

SECTION C-C

SECTION D-D

VIEW F

VIEW G

VIEW H

# SEQUENTIAL COOLING INSERT FOR TURBINE STATOR VANE

CROSS-REFERENCE TO RELATED APPLICATIONS

This application is a DIVISIONAL Application of U.S. application Ser. No. 13/685,053 filed on Nov. 26, 2012 and entitled SEQUENTIAL COOLING INSERT FOR TURBINE STATOR VANE; which claims the benefit to Provisional Patent Application 61/725,507 filed on Nov. 13, 2012 and entitled SEQUENTIAL COOLING INSERT FOR TURBINE STATOR VANE.

FEDERAL RESEARCH STATEMENT

This invention was made with Government support under contract number DE-FE-0006696 awarded by Department of Energy. The Government has certain rights in the invention.

BACKGROUND OF THE INVENTION

Field of the Invention

The present invention relates generally to a gas turbine engine, and more specifically to a turbine stator vane with sequential impingement cooling.
Description of the Related Art including information disclosed under 37 CFR 1.97 and 1.98

In a gas turbine engine, air is first compressed to a high pressure in a compressor. The high pressure air is then mixed with fuel and burned at nearly constant pressure in the combustor. The high temperature gas exhausted from the combustor is then expanded through a turbine which then drives the compressor. If executed correctly, the exhaust stream from the turbine maintains sufficient energy to provide useful work by forming a jet, such as in aircraft jet propulsion or through expansion in another turbine which may then be used to drive a generator like those used in electrical power generation. The efficiency and power output from these machines will depend on many factors including the size, pressure and temperature levels achieved and an agglomeration of the efficiency levels achieved by each of the individual components.

Current turbine components are cooled by circulating relatively (to the gas turbine engine) cool air, which is extracted from the compressor, within passages located inside the component to provide a convective cooling effect. In many recent arrangements, the spent cooling flow is discharged onto the surfaces of the component to provide an additional film cooling effect.

The challenge to cool first stage turbine vanes (these are exposed to the highest temperature gas flow), in particular, is complicated by the fact that the pressure differential between the vane cooling air and the hot gas which flows around the airfoil must necessarily be small to achieve high efficiency. Specifically, coolant for the first stage turbine vane is derived from the compressor discharge, while the hot gas is derived from the combustor exit flow stream. The pressure differential available for cooling is then defined by the extremely small pressure drop which occurs in the combustor. This is because the pressure of the coolant supplied to the vane is only marginally higher than the pressure of the hot gas flowing around the airfoil as defined by the combustor pressure loss, which is desirably small. This pressure drop is commonly on the order of only a few percentage points. Further, it is desirable to maintain coolant pressure inside the vane higher than the pressure in the hot gas flow path to insure coolant will always flow out of the vane and not hot gas into the vane. Conversely, in the event hot gas is permitted to flow into the vane, serious material damage can result as the materials are heated beyond their capabilities and progression to failure will be swift. As a consequence, current first stage turbine vanes are typically cooled using a combination of internal convection heat transfer using single impingement at very low pressure ratio, while spent coolant is ejected onto the airfoil surface to provide film cooling.

The efficiency of the convective cooling system is measured by the amount of coolant heat-up divided by the theoretical heat-up possible. In the limits, little coolant heat-up reflects low cooling efficiency while heating the coolant to the temperature of the surface to be cooled (a theoretical maximum) yields 100% cooling efficiency. In the previous methods using single impingement, the flow could only be used once to impinge on the surface to be cooled. This restriction precludes the ability to heat the coolant substantially, thereby limiting the cooling efficiency.

U.S. Pat. No. 8,096,766 issued to Downs on Jan. 17, 2012 and entitled AIR COOLED TURBINE AIRFOIL WITH SEQUENTIAL COOLING discloses one such insert having sequential cooling where the insert is build up from a stack of alternating plates that are bonded together in chordwise planes. This insert provides for the sequential cooling of the vane walls but is a very expensive insert because of the numerous plates that must be individually machined and then bonded together.

BRIEF SUMMARY OF THE INVENTION

A sequential cooling insert for a turbine stator vane, where the insert is formed from a zigzag shaped main piece that forms a series of alternating impingement cooling air channels and return air channels. A pressure side wall and a suction side wall are secured over the zigzag shaped main piece to enclose the channels. The pressure and suction side walls include rows of impingement cooling air holes and return air holes to form the series of first and second impingement cooling for the vane airfoil.

In a second embodiment, the insert is formed from a pressure side section and a section side section bonded together, where the pressure side section includes spanwise extending rows of impingement channels alternating between spanwise extending rows of return air channels. The suction side section includes chordwise extending rows of impingement channels alternating between rows of return air channels. This embodiment forms a triple impingement with a first impingement on the pressure side, a second impingement on an aft side of the suction side, and a third impingement on a forward side of the suction side of the insert.

Another insert includes a triple impingement in which the insert is formed from one or two blocks of material in which the impingement channels and return air channels are machined into the block or blocks. In one embodiment, the pressure side wall and suction side wall having the impingement cooling holes and return air holes are bonded over the machined section. In another embodiment, the impingement holes and return air holes are drilled into the machined sections.

BRIEF DESCRIPTION OF THE SEVERAL VIEWS OF THE DRAWINGS

FIG. 1 shows a top view of a sequential cooling insert according to a first embodiment of the present invention.
FIG. 2 shows a front view of the insert of FIG. 1.

FIG. 3 shows a side view of the insert of FIG. 1.

Figure shows a cross section cut of the insert through line A-A in FIG. 3.

Figure 5:
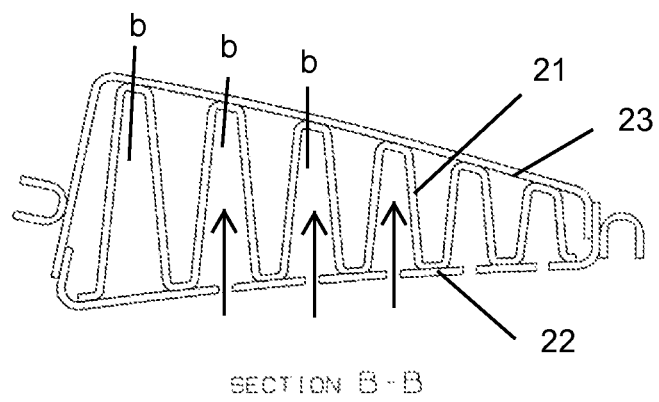

FIG. 5 shows a cross section cut of the insert through line B-B in FIG. 3.

Figure 6:
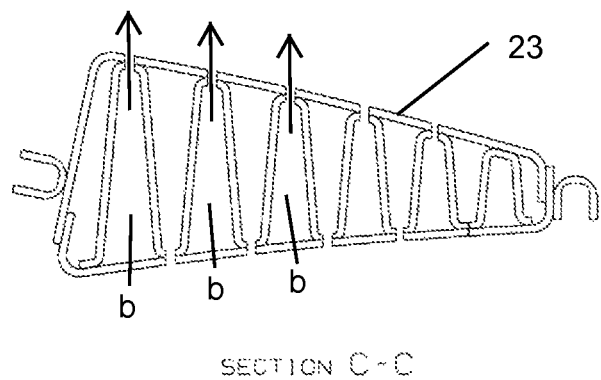

FIG. 6 shows a cross section cut of the insert through line C-C in FIG. 3.

Figure 7:
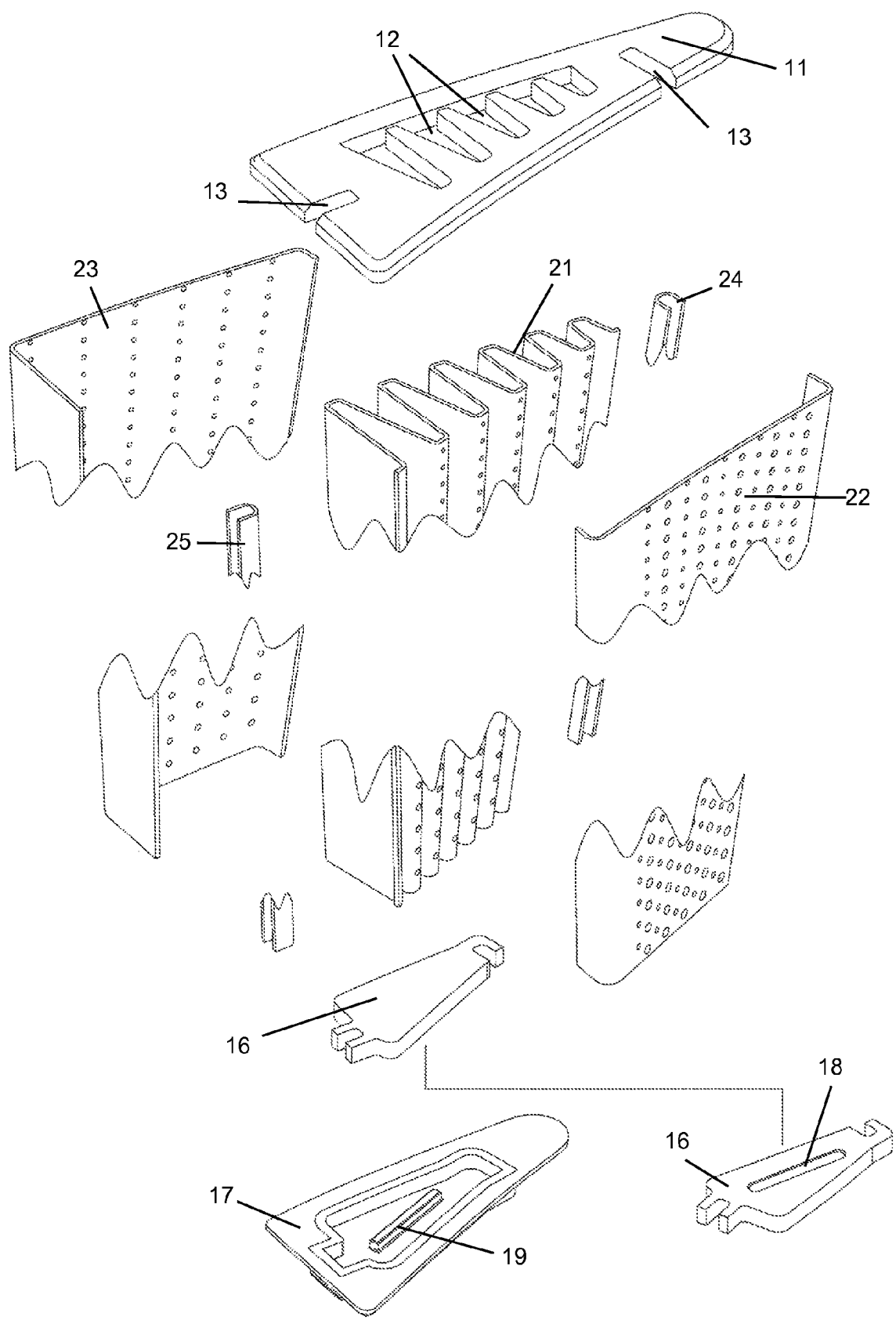

FIG. 7 shows an exploded view of the insert of FIG. 1 in all its pieces.

Figure 8:
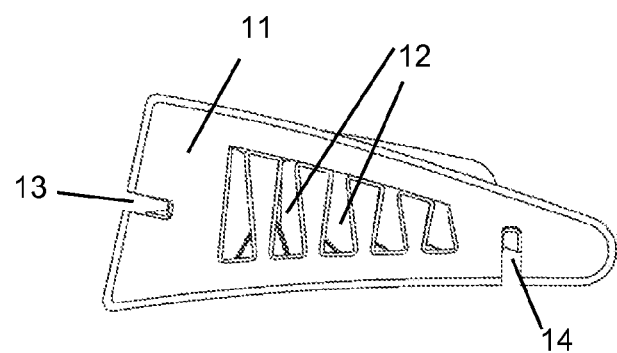

FIG. 8 shows a top view of a sequential cooling insert according to a second embodiment of the present invention.

Figure 9:
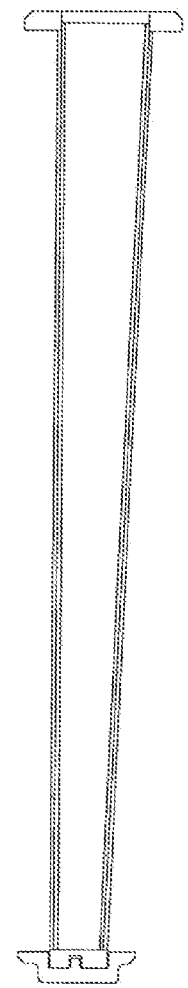

FIG. 9 shows a front view of the insert of FIG. 8.

Figure 10:
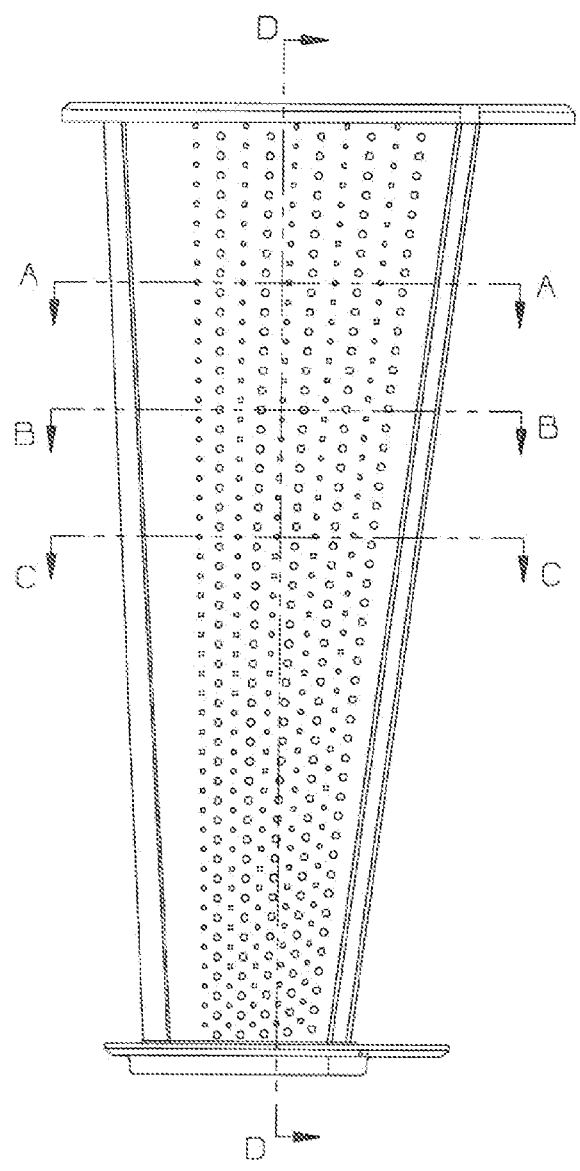

FIG. 10 shows a side view of the insert of FIG. 8.

Figure 11:
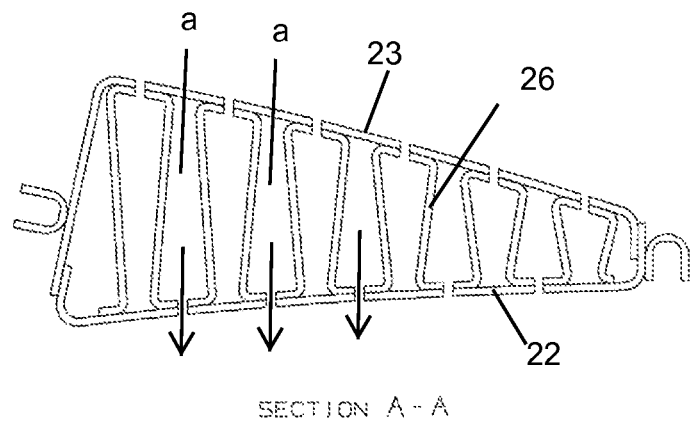

FIG. 11 shows a cross section cut of the insert through line A-A in FIG. 10.

Figure 12:
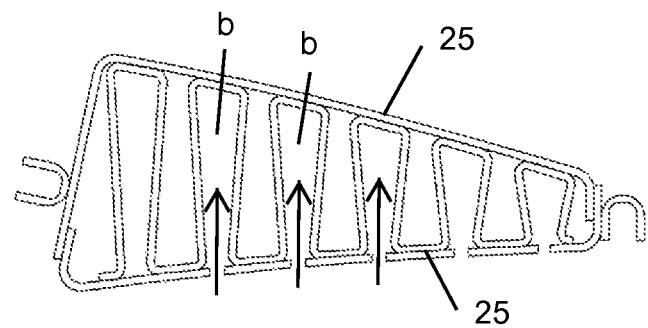

FIG. 12 shows a cross section cut of the insert through line B-B in FIG. 10.

Figure 13:
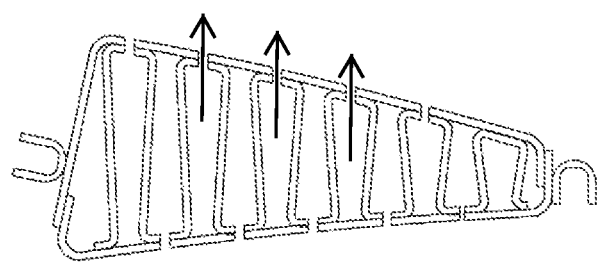

FIG. 13 shows a cross section cut of the insert through line C-C in FIG. 10.

Figure 14:
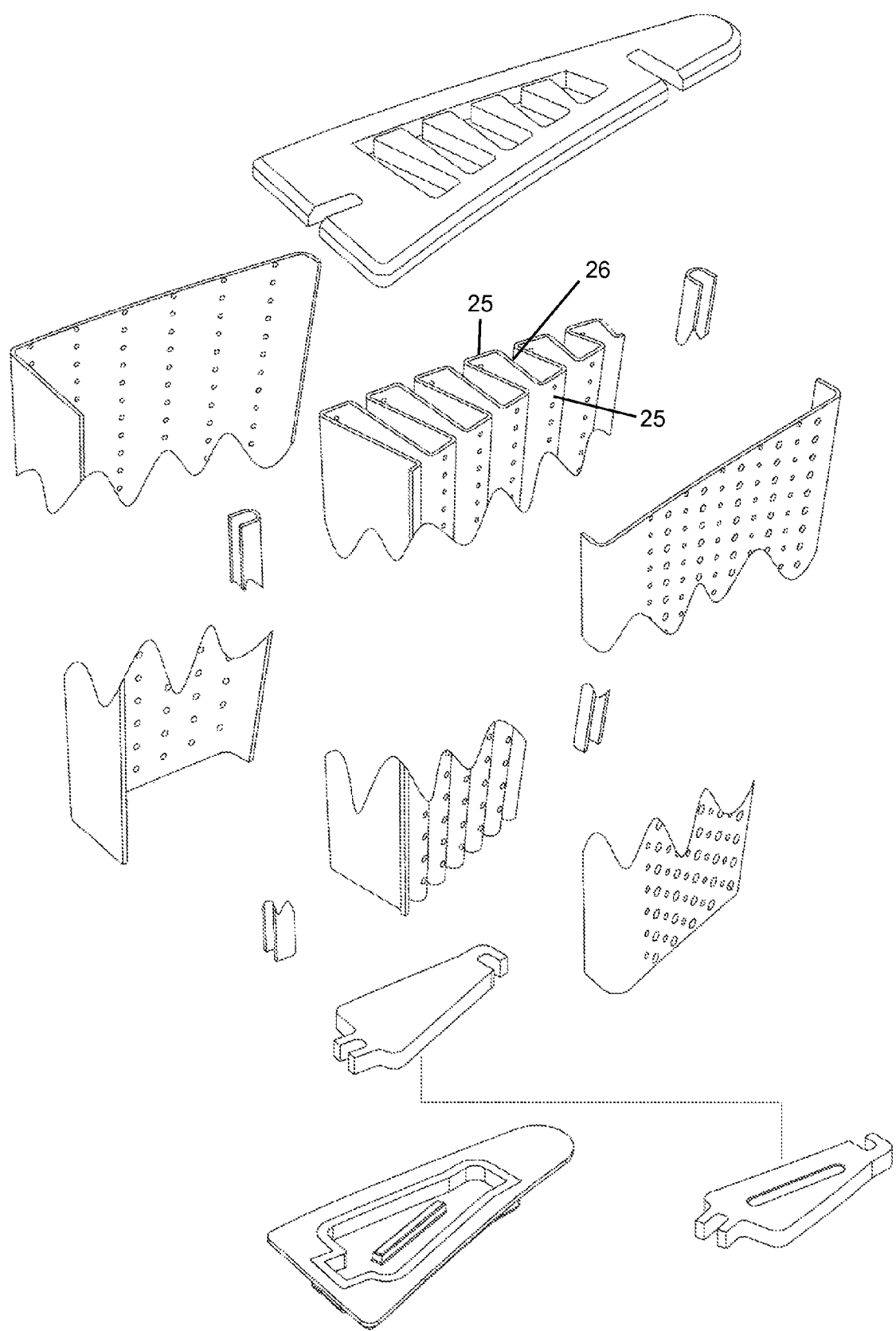

FIG. 14 shows an exploded view of the insert of FIG. 8 in all its pieces.

Figure 15:
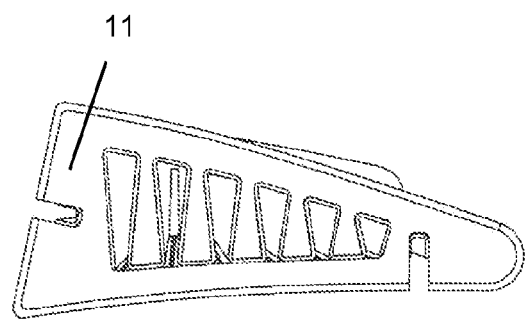

FIG. 15 shows a top view of a sequential cooling insert according to a third embodiment of the present invention.

Figure 16:
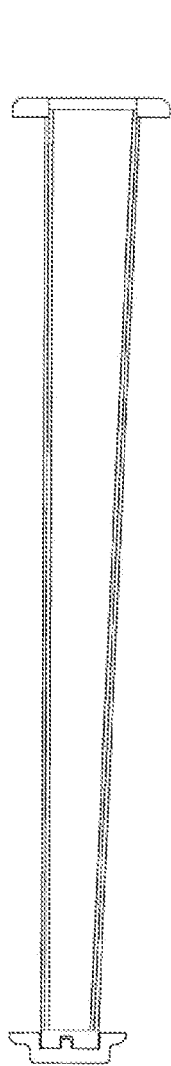

FIG. 16 shows a front view of the insert of FIG. 15.

Figure 17:
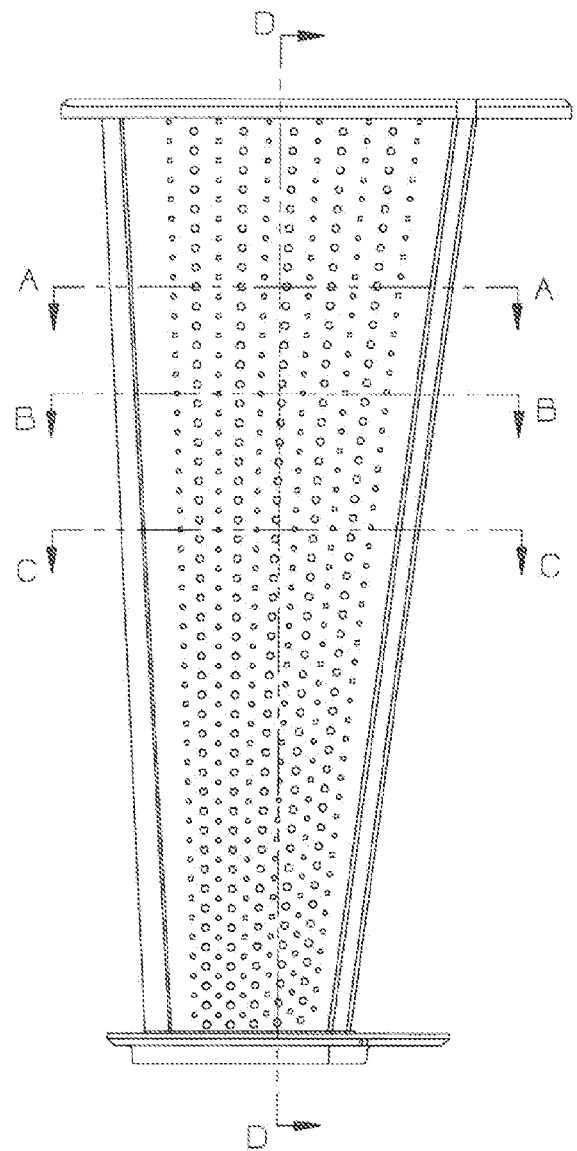

FIG. 17 shows a side view of the insert of FIG. 15.

Figure 18:
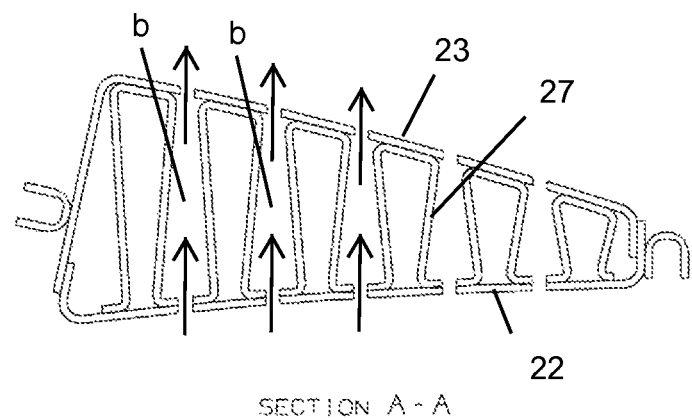

FIG. 18 shows a cross section cut of the insert through line A-A in FIG. 17.

Figure 19:
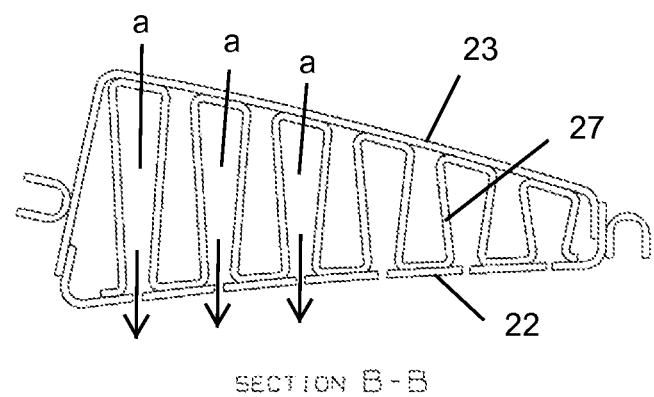

FIG. 19 shows a cross section cut of the insert through line B-B in FIG. 17.

Figure 20:
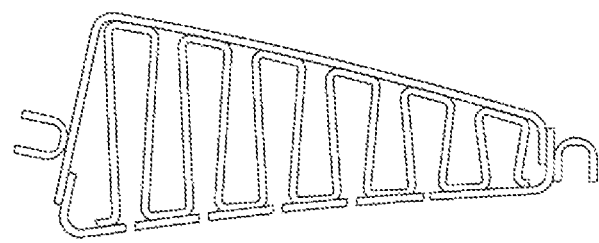

FIG. 20 shows a cross section cut of the insert through line C-C in FIG. 17.

Figure 21:
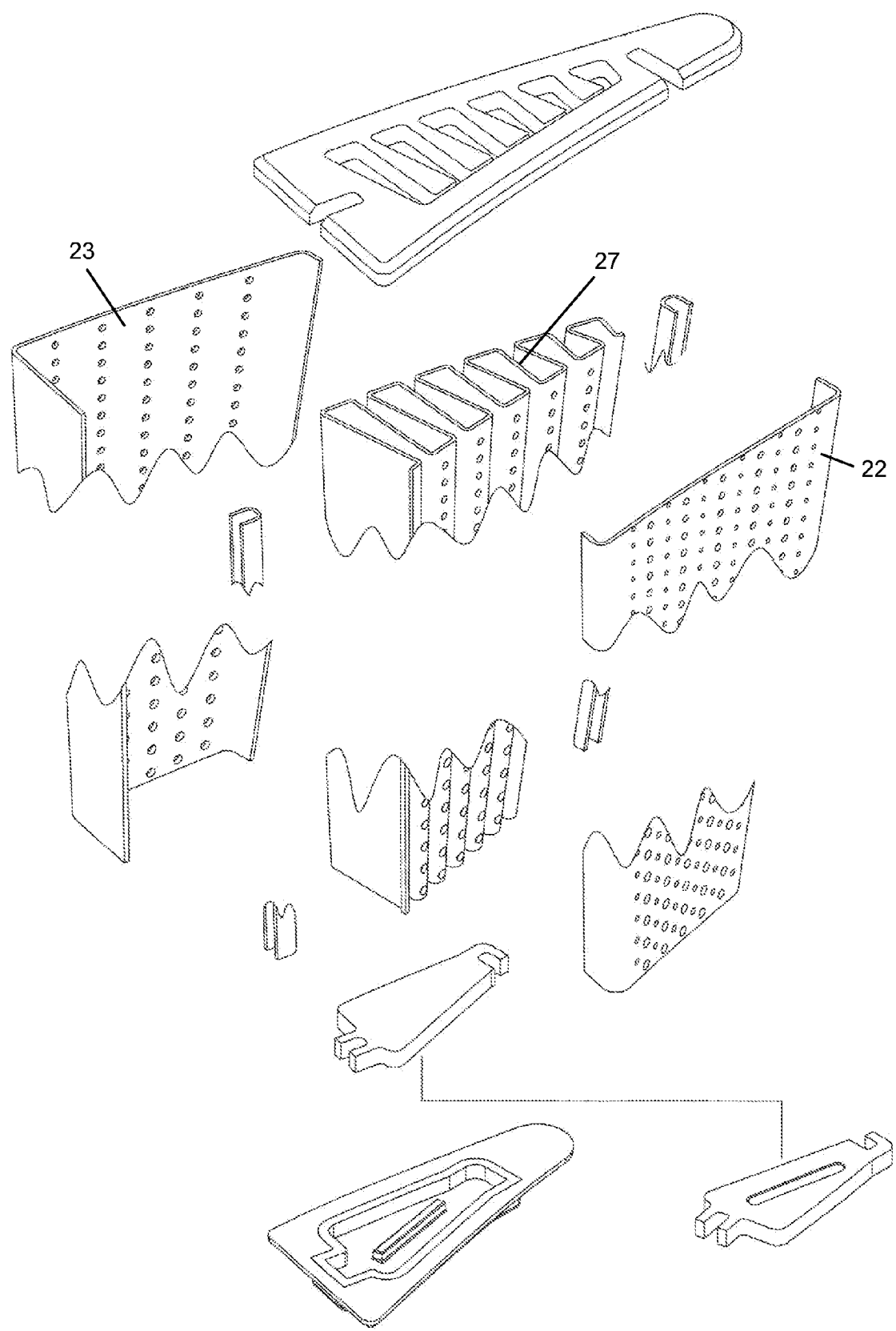

FIG. 21 shows an exploded view of the insert of FIG. 15 in all its pieces.

FIG. 22 shows a top view of a sequential cooling insert according to a fourth embodiment of the present invention.

FIG. 23 shows a front view of the insert of FIG. 22.

FIG. 24 shows a side view of the insert of FIG. 22.

Figure 25:
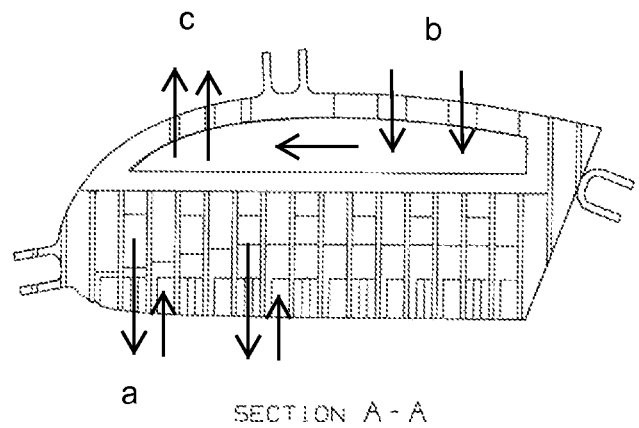

FIG. 25 shows a cross section cut through line A-A of the insert in FIG. 24.

Figure 26:
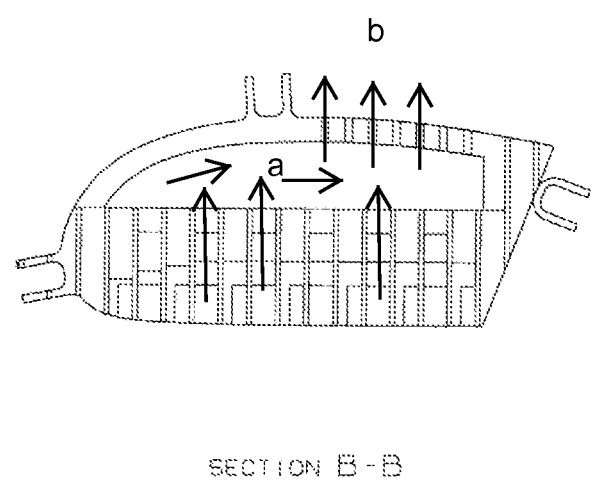

FIG. 26 shows a cross section cut through line B-B of the insert in FIG. 24.

Figure 27:
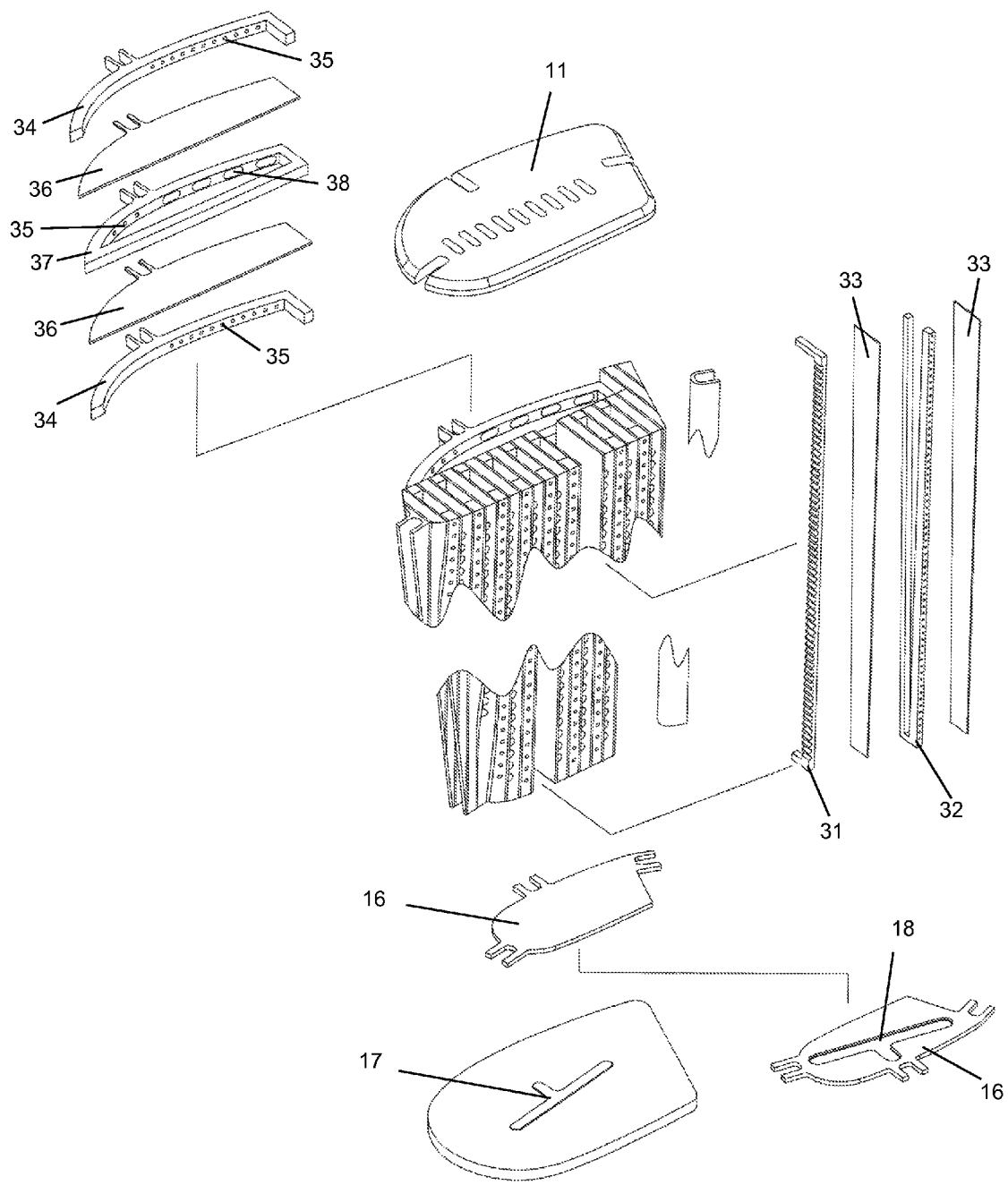

FIG. 27 shows an exploded view of the insert of FIG. 22 in all of its pieces.

Figure 28:
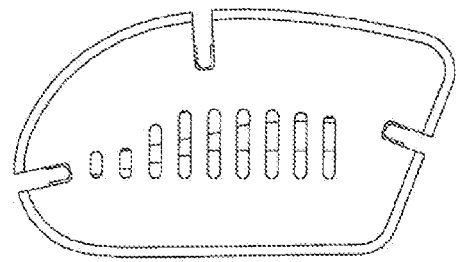

FIG. 28 shows a top view of a sequential cooling insert according to a fifth embodiment of the present invention.

Figure 29:
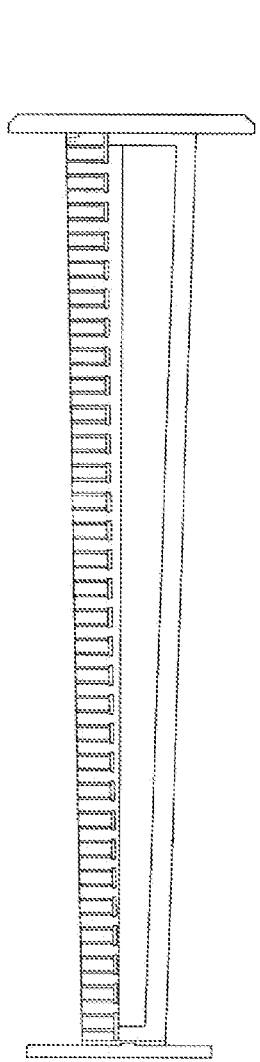

FIG. 29 shows a front view of the insert of FIG. 28.

Figure 30:
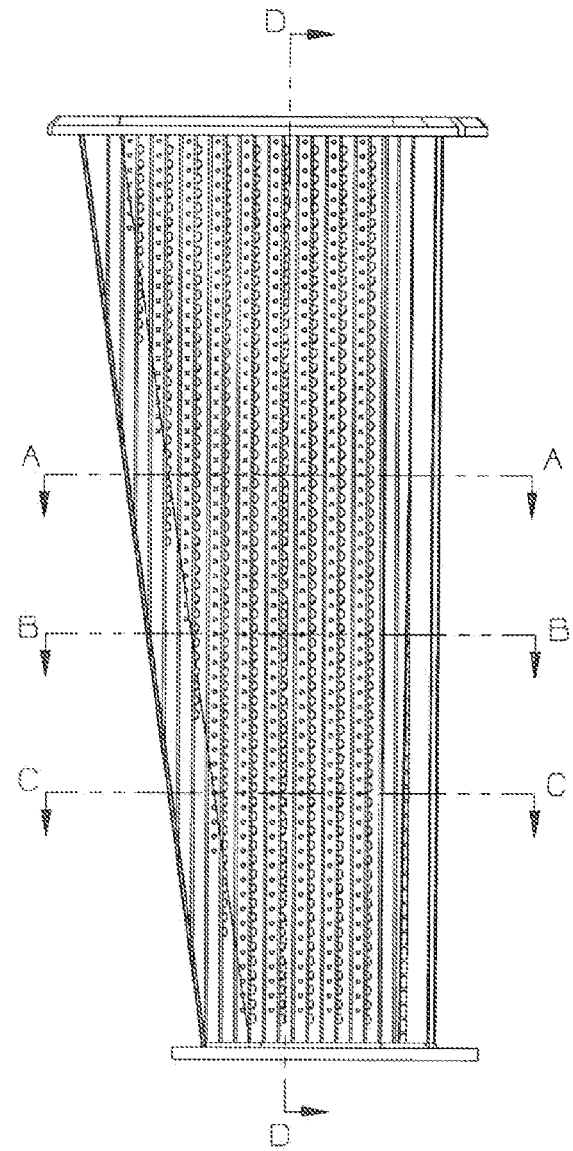

FIG. 30 shows a side view of the insert of FIG. 28.

Figure 31:
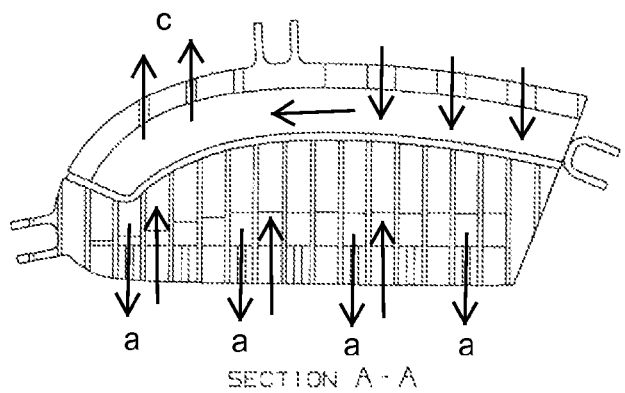

FIG. 31 shows a cross section cut through line A-A of the insert in FIG. 30.

Figure 32:
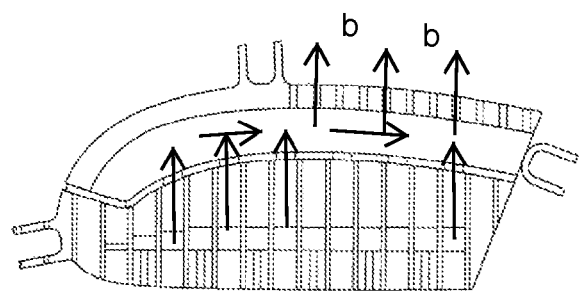

FIG. 32 shows a cross section cut through line B-B of the insert in FIG. 30.

Figure 33:
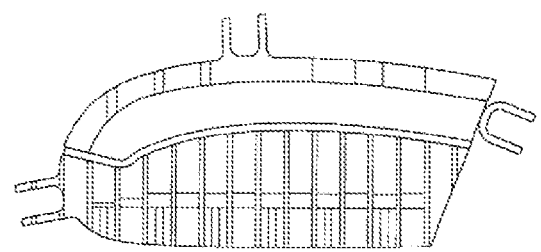

FIG. 33 shows a cross section cut through line C-C of the insert in FIG. 30.

Figure 34:
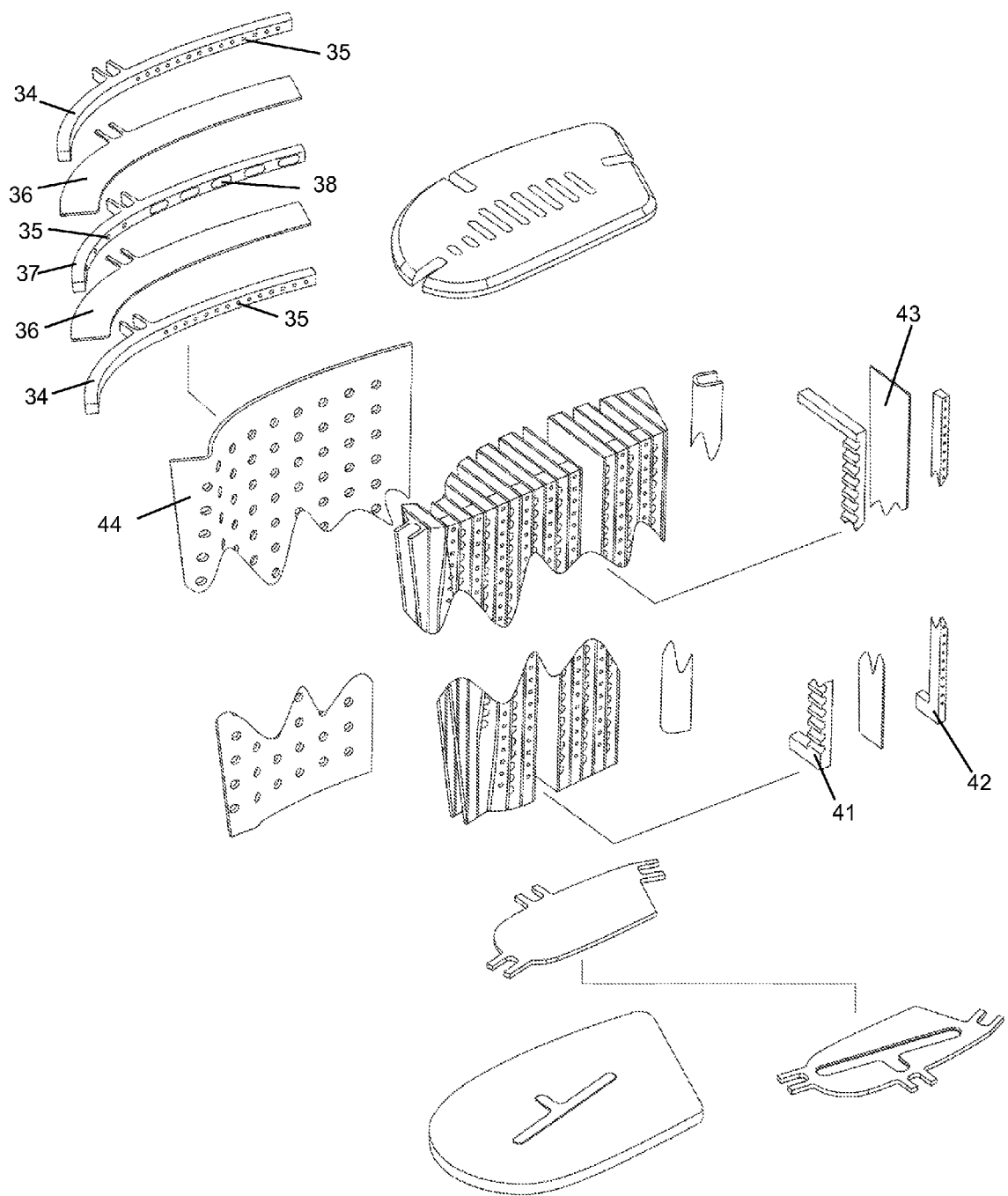

FIG. 34 shows an exploded view of the insert of FIG. 28 in all of its pieces.

FIG. 35 shows a top view of a sequential cooling insert according to a sixth embodiment of the present invention.

FIG. 36 shows a front view of the insert of FIG. 35 through line D-D in FIG. 37.

FIG. 37 shows a side view of the insert of FIG. 35.

Figure 38:
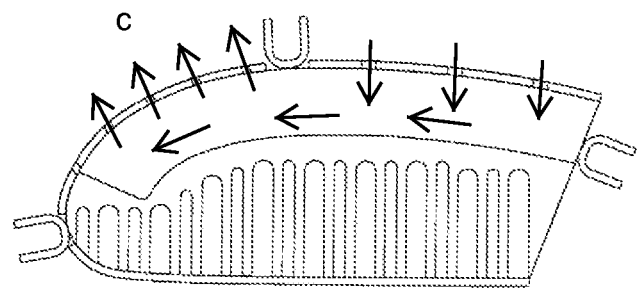

FIG. 38 shows a cross section cut through line A-A of the insert in FIG. 37.

Figure 39:
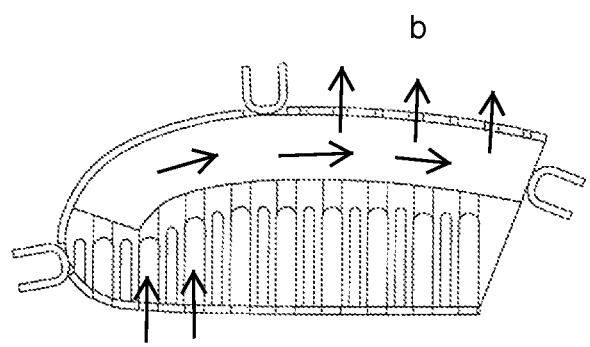

FIG. 39 shows a cross section cut through line B-B of the insert in FIG. 37.

Figure 40:
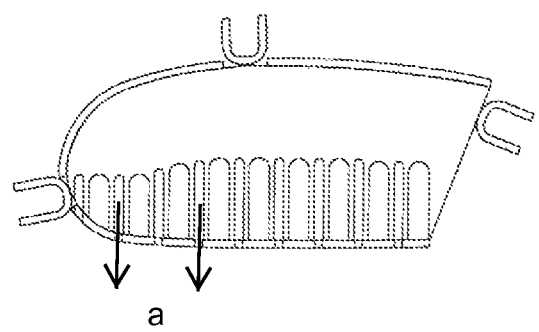

FIG. 40 shows a cross section cut of the insert through line C-C of the insert in FIG. 37.

Figure 41:
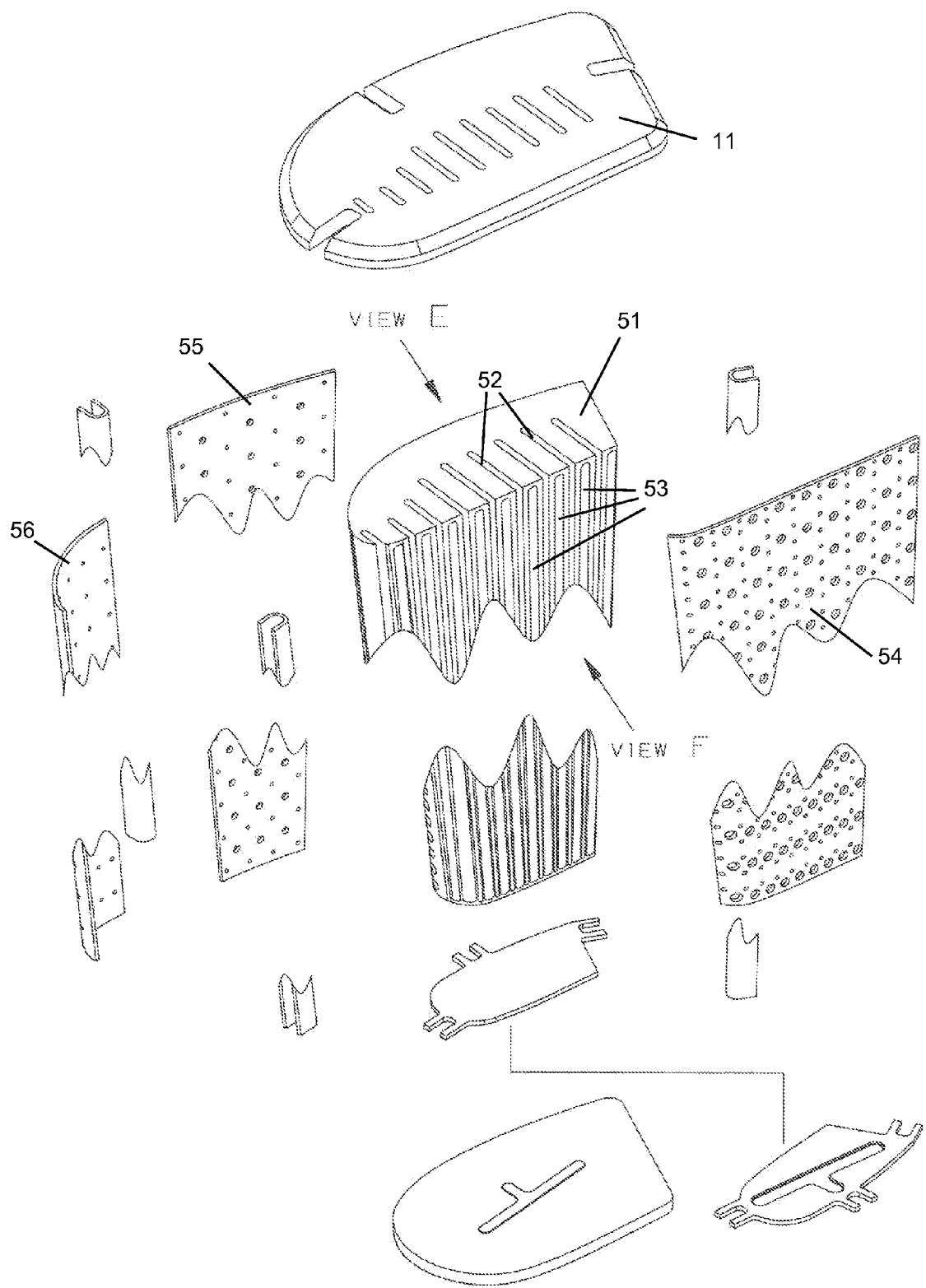

FIG. 41 shows an exploded view of the insert of FIG. 28 in all of its pieces.

FIG. 42 shows a side view of the insert from angle E in FIG. 41.

FIG. 43 shows a side view of the insert from angle F in FIG. 41.

FIG. 44 shows a top view of a sequential cooling insert according to a seventh embodiment of the present invention.

FIG. 45 shows a front view of the insert of FIG. 44.

FIG. 46 shows a side view of the insert of FIG. 44.

Figure 47:
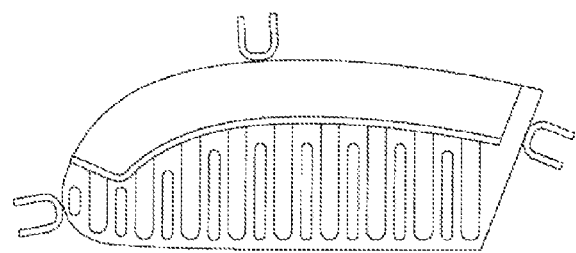

FIG. 47 shows a cross section cut through line A-A of the insert in FIG. 46.

Figure 48:
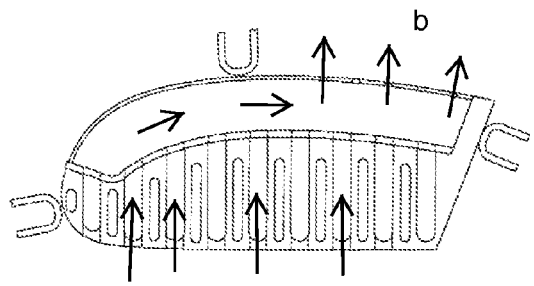

FIG. 48 shows a cross section cut through line B-B of the insert in FIG. 46.

Figure 49:
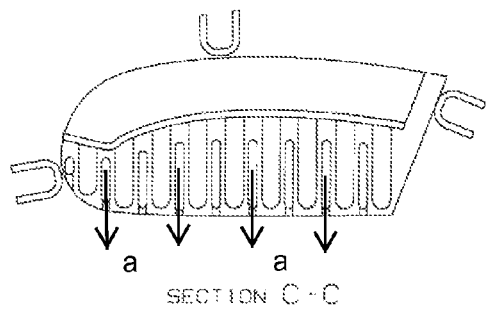

FIG. 49 shows a cross section cut through line C-C of the insert in FIG. 46.

Figure 50:
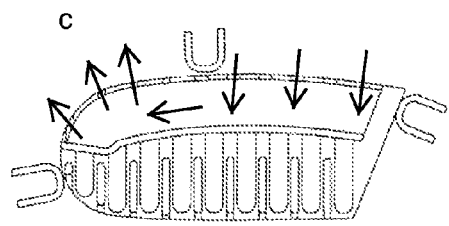

FIG. 50 shows a cross section cut through line D-D of the insert in FIG. 46.

Figure 51:
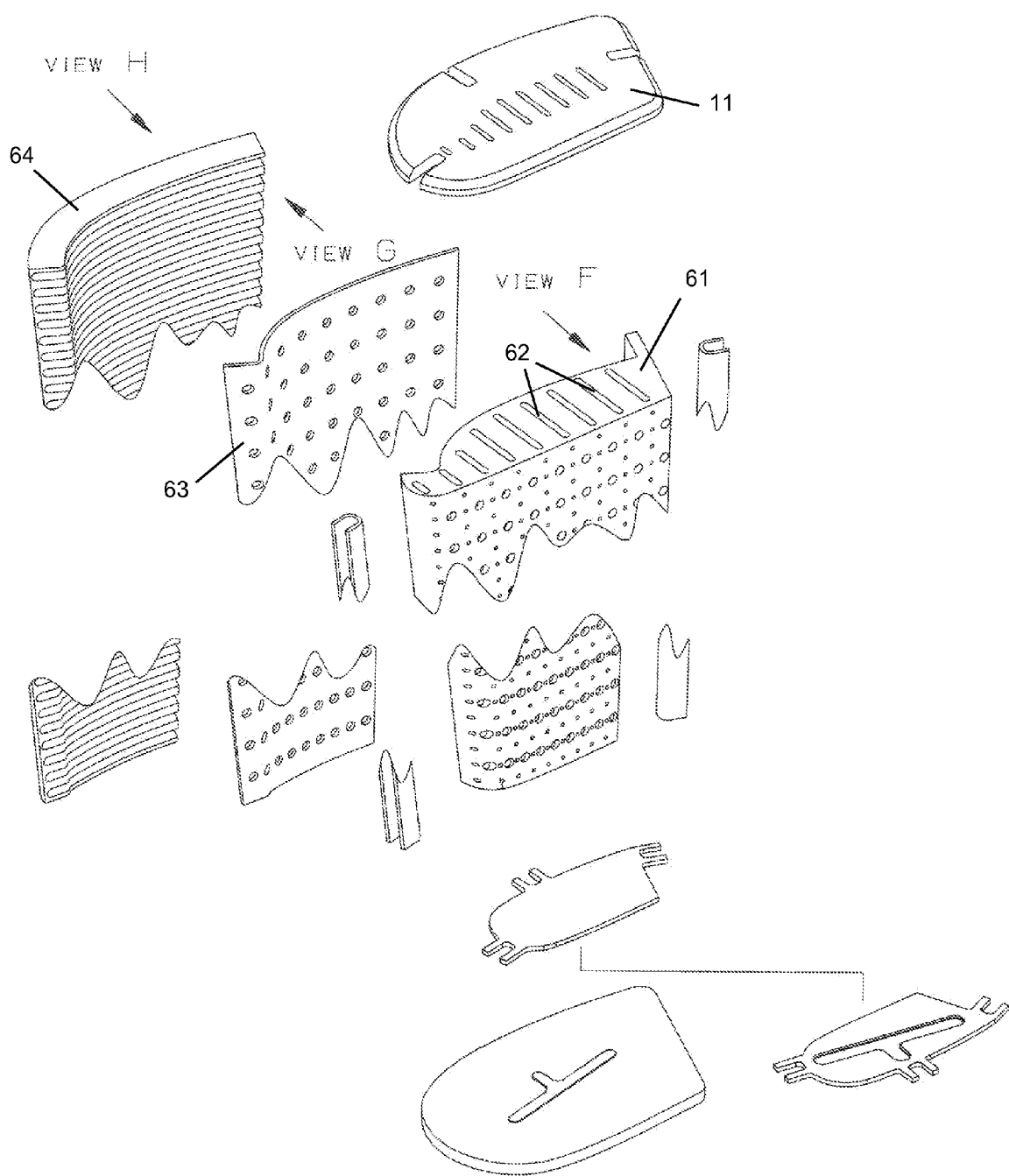

FIG. 51 shows an exploded view of the insert of FIG. 44 in all of its pieces.

Figure 52:
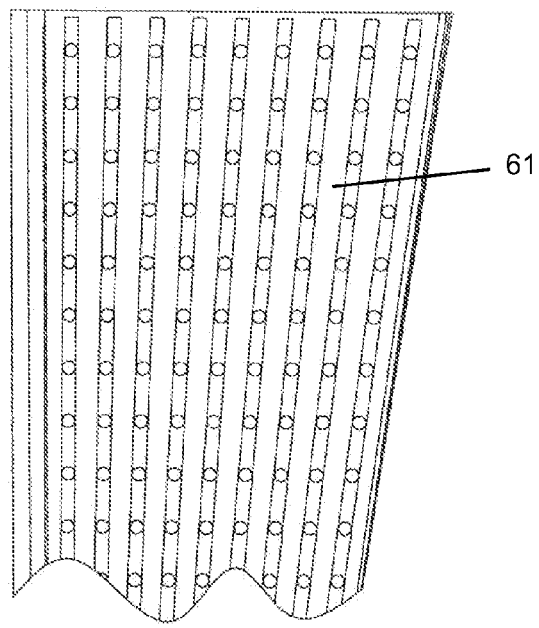

FIG. 52 shows a side view of the insert of FIG. 44 from an angle F in FIG. 51.

Figure 53:
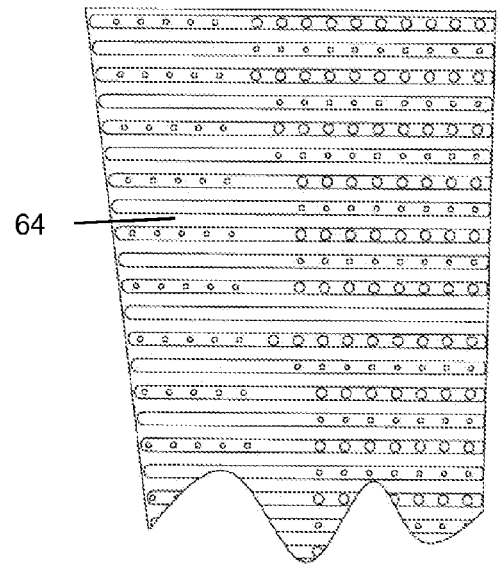

FIG. 53 shows a side view of the insert of FIG. 44 from an angle G in FIG. 51.

Figure 54:
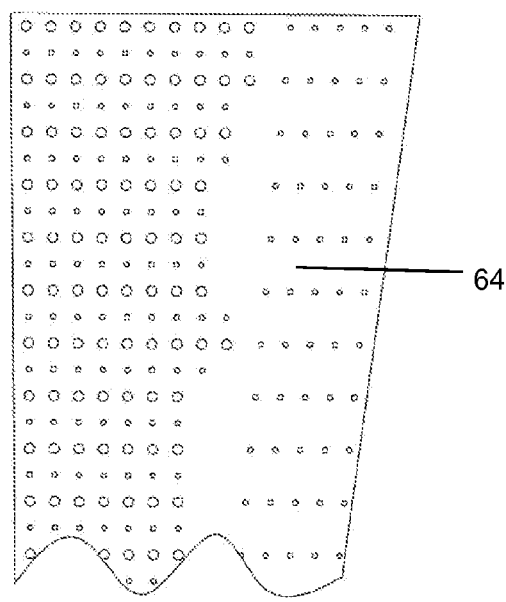

FIG. 54 shows a side view of the insert of FIG. 44 from an angle H in FIG. 51.

DETAILED DESCRIPTION OF THE INVENTION

The present invention is an insert for use in a hollow turbine stator vane to provide impingement cooling of the backside surfaces of the walls of the vane using a sequential impingement cooling circuit formed within the insert. The insert of the present invention is a much simpler design than the prior art Downs AIR COOLED TURBINE AIRFOIL WITH SEQUENTIAL COOLING design and thus can be made much cheaper and with fewer pieces. The sequential cooling insert of the present invention is intended for use in a large frame heavy duty industrial gas turbine engine for the first stage stator vanes, but could be used in smaller aero engines as well. FIGS. 1-7 show various views of a first embodiment of the sequential cooling insert. FIG. 1 shows a top view of an inlet cover plate 11 with cooling air supply openings 12 and two seal grooves 13 for radial extending seals. The inlet cover plate 11 is secured to a top side of the insert and is welded to an outer endwall of the vane. FIG. 2 shows a side view of an insert 15 with the inlet cover plate 11 and a bottom cap 16 secured to a bottom side of the insert 11 that slides within a cap receiver 17 welded or bonded to an inner endwall of the vane. FIG. 3 shows a side view of the insert 15 with rows of impingement cooling air holes (smaller holes) and rows of return air holes (larger holes).

Figure 4:
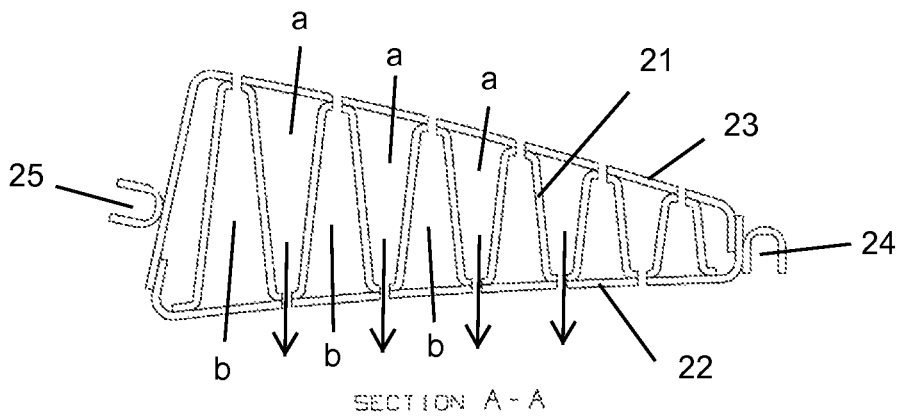

FIG. 4 shows a cross section view from a top direction of the features of the insert that includes a passage divider 21 with a suction side impingement plate 23 bonded to a suction side of the passage divider 21 and a pressure side impingement plate 22 bonded to a pressure side of the divider plate 21. Two seal grooves 24 and 25 are bonded to the insert in alignment with the seal grooves 13 and 14 in the inlet cover plate 11 to receive the radial extending seals. The divider plate 21 is a one piece divider plate bent into a zigzag shape to form alternating channels of impingement cooling air channels (a) and return air channels (b). The impingement cooling air channels (a) are connected directly to the cooling air supply openings 12 formed in the inlet cover plate 11. A row of impingement cooling air holes is formed on the pressure side of the insert in the divider plate 21 and the pressure side impingement plate 22 that discharge impingement cooling air from the impingement cooling air channels (a) against the pressure side wall of the vane.

FIG. 5 shows another view of the insert with the return air cooling holes formed in the pressure side impingement plate 22 that open into the return air cooling channels (b). FIG. 6 shows another view of the insert with the suction side impingement plate 23 having rows of impingement cooling holes connected to the return air cooling channels (b) that discharge impingement cooling air to the backside surface of the suction side wall of the vane.

FIG. 7 shows an exploded view of the insert of the first embodiment. The pressure side impingement plate 22 bonded to the divider plate 21 includes spanwise extending rows of impingement cooling holes (smaller holes) and larger return air holes. The divider plate 21 is welded or bonded to the inlet cover plate 11, and the inlet cover plate 11 is welded or bonded to the vane outer endwall to secure the insert to the hollow section of the vane. The bottom cap 16 includes a slot 18 on the bottom side that slides over a rail 19 formed on an inner side of the cap receiver 17 welded or bonded to the vane inner endwall. The slot 18 and the rail 19 allow for the insert and the cap receiver 17 to expand and contract in a radial or spanwise direction of the vane due to thermal growth between the vane and the insert. The insert is thus formed from three major pieces that include the divider plate 21 and the P/S and S/S impingement plates 22 and 23. The inlet cover plate 11 will also close off the return air channels (b) so that the return cooling air will flow through the impingement cooling holes formed within the S/S impingement plate 22.

The insert is assembled and then placed within the hollow vane airfoil with the inlet cover plate 11 welded or bonded to the vane outer endwall to secure the insert within the vane, with the insert secured within the vane, two radial extending seals are insert into the seal grooves 24 and 25 through the seal openings 13 and 14 formed in the inlet cover plate 11, and then the openings 13 and 14 are closed by plugs to secure the seals in place. Cooling air supplied to the cooling air supply openings 12 will flow into the impingement cooling air channels (a) as seen in FIG. 4 to produce impingement cooling for the P/S surface of the vane, then collect and flow through the return air holes and into the return air channels (b) as seen in FIG. 5, and then flow through the impingement cooling holes formed in the S/S impingement plate (FIG. 6) to produce impingement cooling for the S/S wall of the vane. Spent impingement cooling air for the S/S wall is collected and directed to flow out from the vane through a row of exit holes in the trailing edge or exit slots formed on a pressure side wall in the trailing edge region of the vane.

The insert of FIGS. 1-7 has the P/S impingement plate 22 and the S/S impingement plate 23 welded or bonded to the divider plate 21, and then the impingement cooling holes and return air holes are drilled into the plates. In the FIGS. 1-7 embodiment, the impingement holes on the P/S and S/S impingement plates are drilled through two plates: the P/S impingement plate 22 and the divider plate 21 on the P/S and the S/S impingement plate 23 and the divider plate 21 on the S/S of the insert. The insert of FIGS. 1-7 provides for a series flow of impingement cooling air with the pressure side wall cooled first followed by the suction side wall using the same cooling air flow.

FIGS. 8 through 14 show a second embodiment of the sequential cooling insert of the present invention. The inlet cover plate 11 is similar to that of the FIG. 1 embodiment. A divider plate 26 is similar to the divider plate 21 in the FIG. 4 embodiment with a P/S impingement plate 22 and a S/S impingement plate 23 welded or bonded to the sides. However, the divider plate 26 in FIG. 11 is shaped so that a bonding surface 25 between the divider plate 21 and the two impingement plates 22 and 23 is much wider than in the FIG. 4 embodiment. The bonding surface 25 is the location where the impingement holes are drilled through the two plates on the P/S and the S/S. The impingement cooling air supply channels (a) in the FIG. 11 embodiment are diverging toward the impingement holes, while in the FIG. 4 embodiment the impingement supply channels (a) are diverging. This is the difference between the first embodiment of FIGS. 1-7 and the second embodiment of FIGS. 8-14.

FIG. 14 shows an exploded view of the insert of the second embodiment with the divider plate 26 having the impingement holes formed on the wider surface 25 that forms the bonding surface for the impingement plates 22 and 23. Cooling air supplied through the inlet cover plate openings 12 flows into the impingement cooling air supply channels (a) and then through the impingement cooling air holes on the P/S, then flows into the return air channels (b) and then through the S/S impingement cooling air holes.

FIGS. 15 through 21 show a third embodiment of the present invention with a divider plate 27 having the P/S impingement plate 22 and a S/S impingement plate 23 welded or bonded to the surfaces. In the FIG. 18 embodiment, the divider plate 27 is shaped such that the impingement cooling holes on the P/S and the S/S impingement plates only need to be drilled through one plate and not through two plates like in the FIG. 4 and FIG. 11 embodiments. The return air holes (larger holes) are still drilled through two plates in the insert. Impingement supply channels (a) are shown in FIG. 19 with impingement cooling holes directed to the P/S, and the return air channels (b) are shown in FIG. 18 with impingement cooling holes directed to discharge to the S/S wall of the vane. In the FIG. 19 embodiment, the impingement cooling holes on the P/S and the S/S are located at an end of a converging channel (a) or (b) and the impingement holes are formed in only one plate. Also, in this embodiment the bonding surface for the impingement plates 22 and 23 on the divider plate 27 is a larger surface area. Thus, the FIG. 21 insert is stronger than the other two inserts.

A fourth embodiment of the insert is shown in FIGS. 22 through 27 and forms not a double or two series of impingement but triple or three series of impingement. The inlet cover plate 11 includes three seal grooves 13 instead of two as in earlier embodiments. FIG. 25 shows a cut through the insert with impingement cooling air supply channels formed on a P/S of the insert for the entire pressure side wall of the vane with return air channels spaced in-between. Spent impingement cooling air form the P/S wall flows through the return air channels and into a collection cavity formed on the S/S part of the insert as seen in FIG. 26 and then flows out through impingement cooling holes (b) for cooling an aft section of the vane on the suction side wall. Cooling air from (b) flows into a second collection cavity in FIG. 25 and then flows through impingement cooling holes (c) on a forward section of the S/S wall to provide impingement cooling here. Thus, in the FIGS. 22 through 27 embodiment of the insert, the P/S wall is cooled first with impingement cooling air, then the aft section of the S/S wall with the same cooling air, and then the forward section of the S/S wall with the same cooling air in series by the insert.

FIG. 27 shows an exploded view of the complex assembly of the fourth embodiment of the insert. A main body of the insert is formed from a series of spanwise extending pieces that includes a return plenum piece 31, an impingement supply piece 32, and a vertical divider sheet 33. The return plenum piece 31 has slots formed on one side on the P/S side that forms return air holes when bonded to the divider sheet 33. The impingement supply piece 32 includes impingement holes drilled into the P/S side of the piece. An alternating arrangement of these pieces are bonded together to form the P/S section of the insert with the impingement holes and return holes for the pressure side of the insert.

The suction side wall of the insert is formed by a series of chordwise extending pieces that include a S/S secondary impingement chamber piece 34 with impingement holes 35, a S/S tertiary impingement chamber piece 37 with impingement holes 35 and return air holes 38, and horizontal divider sheets 36 stacked in an alternating arrangement to form the second and third impingement chambers for the suction side wall of the vane. All of the pieces that form the impingement holes and return holes for the pressure side and the suction side walls of the vane are bonded together to form a single piece insert.

In the insert of FIGS. 22 through 27, cooling air flows through the openings in the inlet cover plate 11 and down through the impingement cooling air supply channels extending in a spanwise direction and through the rows of first impingement holes to provide impingement cooling for the entire P/S wall of the vane. The spent first impingement cooling air then flows through the rows of larger return air holes formed on the P/S section of the insert and then into the collection chambers formed by the S/S secondary impingement plates 34 where the cooling air then flows through the second impingement cooling holes 35 to provide cooling for an aft section of the S/S wall. The spend second impingement cooling air then flows through the return air holes 38 formed by the tertiary impingement plates 37 and then through the third impingement cooling holes 35 to provide impingement cooling for the forward section of the S/S wall of the vane. The spent third impingement cooling air can then flow out from the vane through an arrangement of film cooling holes formed on the vane airfoil in this section of the vane.

A fifth embodiment of the insert is shown in FIGS. 28 through 34 and is similar to the fourth embodiment shown in FIG. 27 with three impingement locations in series. The fifth embodiment in FIG. 34 includes a divider plate 44 with crossover holes secured between the P/S section of the insert and the S/S section. The FIG. 34 embodiment includes a return plenum piece 41 with slots to form the return air holes and an impingement supply piece 42 having an L-shape with impingement cooling holes formed on the side facing the P/S wall. A divider sheet 33 is used to separate both pieces 41 and 42.

The suction wall side of the insert is formed by the same chordwise extending pieces as in the FIG. 27 embodiment but with an addition of the divider plate 44 with the cross-over holes. The stacks of spanwise extending pieces on the P/S and the chordwise extending pieces on the S/S and the divider plate 44 are bonded together to form the single piece insert. Cooling supply air flows through the openings in the inlet cover plate 11 and into the spanwise extending impingement cooling air supply channels on the P/S and through the first impingement cooling holes to cool the P/S of the vane. The spent first impingement cooling air then flows through the rows of spanwise extending return air channels and into the collection cavities formed on the S/S section of the insert through the cross-over holes in the divider plate 44 and then through the second impingement cooling holes to cool the aft side of the S/S wall. The second impingement cooling air then flows through the return air holes 38 and then through the third impingement cooling holes 35 to provide cooling for the forward section of the S/S wall of the vane.

A sixth embodiment of the insert is shown in FIGS. 35 through 41 and is similar to the fourth and fifth embodiments in that a series of three impingements occur. The sixth embodiment of FIG. 41 is not formed with a stack of pieces bonded together but from a single piece machined with the impingement channels and return air channels formed therein. One piece 51 is machined on the P/S and the S/S with the spanwise extending feed slots 52 and the return air channels 53 on the P/S and with the chordwise extending feed channels and return air channels on the S/S of the insert. The P/S impingement plate 54 and the aft and forward S/S impingement plate 55 and 56 are then bonded over the main insert piece 51 to enclose the channels. The impingement plates 54 and 55 that form the impingement and return holes for the P/S of the vane and the aft section on the S/S include both impingement holes and return air holes, while the forward S/S impingement plate 56 includes only impingement cooling holes. The flow through the insert of FIG. 41 works the same as in the FIGS. 27 and 34 embodiments.

FIG. 42 shows a side view of the insert on the S/S side with the chord wise extending impingement supply channels and return air channels alternating along the insert. FIG. 43 shows a side view of the insert from the P/S side with the spanwise extending impingement supply channels and the return air channels alternating. Return air holes are shown in both FIGS. 42 and 43 views. The impingement holes are formed by the impingement plates bonded over the return air holes.

FIGS. 44 through 54 shows a seventh embodiment of the insert and also includes a series of three impingement cooling surfaces connected in series. In this FIG. 51 embodiment, the insert is formed with a P/S main piece 61 and a S/S main piece 64 both having the supply and return channels formed therein by machining and the impingement holes and return holes drilled into them. The P/S main piece 61 includes the spanwise extending feed holes 62 with the impingement holes and return air holes drilled from the P/S surface to the feed holes or return air channels. A divider plate 63 with cross-over holes is secured between the P/S piece 61 and the S/S piece 64. The S/S piece 64 includes the chordwise extending impingement supply channels and the return air channels machined into the S/S face.

FIG. 52 shows the outside surface of the P/S piece with the spanwise extending return air channels and return air holes. FIG. 53 shows the inside surface of the S/S piece with the chordwise extending channels that include channels with return holes and impingement holes for the second impingement section of the vane and channels with only impingement holes for the third impingement section of the vane. FIG. 54 shows an external surface of the S/S surface of the insert 64 with the impingement holes and return holes for the aft section on the left side and the impingement holes for the forward section of the S/S wall of the vane on the right side of this figure.

The insert represented by FIG. 51 receives cooling air from openings in the inlet cover plate that then flows into the spanwise extending impingement cooling supply channels on the P/S of the insert, then through the impingement cooling holes for the first impingement on the entire P/S wall of the vane, the spent first impingement cooling air then flows into the spanwise extending return air channels and through the cross-over holes in the divider plate 63 and into the chordwise extending impingement supply channels on the S/S side of the insert. This cooling air then flows through the second impingement cooling holes formed on the aft section of the S/S wall and then into the return air channels, where the cooling air then flows through the third series of impingement cooling air holes in the forward section of the S/S wall of the vane.

We claim the following:

1. An impingement cooling insert for a turbine stator vane of a gas turbine engine, the impingement cooling insert comprising:
    a pressure side piece;
    a suction side piece;
    the pressure side piece having a plurality of spanwise extending impingement cooling air holes alternating with a plurality of spanwise extending return air holes;
    the suction side piece having a plurality of chordwise extending aft side impingement cooling air holes alternating with a plurality of chordwise extending aft return air holes and forward impingement cooling air holes; and,
    the pressure side piece and the suction side piece forming a first impingement cooling on the pressure side of the insert, a second impingement cooling on an aft side of the suction side of the insert, and a third impingement cooling of the forward side of the suction side of the insert connected in series.

2. The impingement cooling insert of claim 1, and further comprising:
    the pressure side piece is formed from a series of impingement cooling air hole pieces and return air pieces with divider sheets bonded together to separate impingement cooling air channels from return air channels.

3. The impingement cooling insert of claim 2, and further comprising:
    the divider sheets cover over the return air holes in the return air pieces.

4. The impingement cooling insert of claim 2, and further comprising:
    the impingement cooling air hole pieces are each U-shaped with the row of impingement cooling air holes formed on a front side of the U-shaped piece.

5. The impingement cooling insert of claim 1, and further comprising:
    the suction side piece is formed by a series of chordwise extending pieces that include a S/S secondary impingement chamber piece with impingement holes, a S/S tertiary impingement chamber piece with impingement holes and return air holes, and horizontal divider sheets stacked in an alternating arrangement to form the second and third impingement chambers for the suction side wall of the vane.

6. The impingement cooling insert of claim 1, and further comprising:
    a divider plate with cross-over holes is secured between the pressure side piece and the suction side piece; and,
    the cross-over holes connects the return air channels on the pressure side piece to the second impingement cooling air holes on the suction side piece.

7. The impingement cooling insert of claim 1, and further comprising:
    the pressure side piece and suction side piece is formed from a single block of metal material that is machined to form the spanwise extending impingement cooling air channels and the return air channels for the pressure side of the insert and the chordwise extending impingement cooling air channels and return air channels for the suction side of the insert.

8. The impingement cooling insert of claim 7, and further comprising:
    a pressure side wall having rows of impingement cooling air holes and rows of return air holes is bonded to a pressure side of the single block formed piece; and,
    a suction side wall having rows of impingement cooling air holes and rows of return air holes is bonded to a suction side of the single block piece.

9. The impingement cooling insert of claim 1, and further comprising:
    the pressure side piece is formed from a first single block of metal material that is machined to form the spanwise extending impingement cooling air channels and the return air channels for the pressure side of the insert; and,
    the suction side piece is formed from a second single block of metal material that is machined to form the chordwise extending impingement cooling air channels and the return air channels for the suction side of the insert.

10. The impingement cooling insert of claim 9, and further comprising:
    a divider plate with cross-over holes is secured between the pressure side piece and the suction side piece; and,
    the cross-over holes connects the return air channels on the pressure side piece to the second impingement cooling air holes on the suction side piece.

11. The impingement cooling insert of claim 9, and further comprising:
    the pressure side piece also includes the impingement cooling air holes and the return air holes formed in the first single block of metal material.

12. The impingement cooling insert of claim 9, and further comprising:
    the suction side piece also includes the impingement cooling air holes and the return air holes formed in the second single block of metal material.

* * * * *